(12) United States Patent
Arippol

(10) Patent No.: US 7,221,572 B2
(45) Date of Patent: May 22, 2007

(54) HOUSING ASSEMBLY FOR STACKING MULTIPLE COMPUTER MODULES

(76) Inventor: Derick Arippol, 2140 Taylor, apt 206, San Francisco, CA (US) 94133

( * ) Notice: Subject to any disclaimer, the term of this patent is extended or adjusted under 35 U.S.C. 154(b) by 0 days.

(21) Appl. No.: 11/544,388

(22) Filed: Oct. 6, 2006

(65) Prior Publication Data
US 2007/0025075 A1    Feb. 1, 2007

Related U.S. Application Data

(63) Continuation of application No. 10/629,320, filed on Jul. 28, 2003, now Pat. No. 7,133,289.

(51) Int. Cl.
*H05K 7/16* (2006.01)

(52) U.S. Cl. .............. 361/724; 361/725; 312/223.1

(58) Field of Classification Search ............. 361/724, 361/725, 726, 727
See application file for complete search history.

(56) References Cited

U.S. PATENT DOCUMENTS

| | | | | |
|---|---|---|---|---|
| 3,289,047 A | * | 11/1966 | Pick | ........................... 361/724 |
| 4,401,351 A | * | 8/1983 | Record | ........................ 439/61 |
| 4,434,899 A | * | 3/1984 | Rivkin | ..................... 211/41.17 |
| 4,926,753 A | * | 5/1990 | Weiss | ....................... 104/88.03 |
| 5,773,954 A | * | 6/1998 | VanHorn | ..................... 320/137 |
| 6,335,868 B1 | * | 1/2002 | Butterbaugh et al. | ........ 361/796 |
| 7,133,289 B2 | * | 11/2006 | Arippol | ..................... 361/724 |

* cited by examiner

*Primary Examiner*—Lisa Lea-Edmonds
*Assistant Examiner*—Anthony Q. Edwards
(74) *Attorney, Agent, or Firm*—Stattler Johansen - Adeli LLP

(57) ABSTRACT

The invention is directed towards assemblies of electrical or electronic circuit boards. More specifically, the present invention relates to an assembly for housing multiple computer circuit boards. The assembly include a housing that has several railing coupled to the housing. A connector is structurally and electrically coupled to the railings for hanging the computer circuit boards. Structural coupling between the connector and the railing is accomplished by placing the connector in contact with the railing in a file hanging method. This contact also creates an electrical coupling and establishes an electrical connection between the connector and the railing.

19 Claims, 8 Drawing Sheets

127

128

Power Supply
each powers a 1/3
of the rail

HOUSING ASSEMBLY FOR STACKING MULTIPLE COMPUTER MODULES

RELATED APPLICATIONS

This patent application claims benefit to and is a continuation of the U.S. Patent Application entitled "A HOUSING ASSEMBLY FOR STACKING MULTIPLE COMPUTER MODULES," having Ser. No. 10/629,320, filed on Jul. 28, 2003, now U.S. Pat. No. 7,133,289.

FIELD OF INVENTION

The invention relates generally to assemblies of electrical or electronic circuit boards. More specifically, the present invention relates to a housing assembly for stacking multiple computer modules.

BACKGROUND OF THE INVENTION

The current course of business demands more power from computer systems. This demand is often met through the creation of computer clusters, of which there are two primary types: "high availability" clusters, where more than one node is used to guarantee the continuous operability of a machine; and, "high performance" clusters, where several nodes combine efforts to yield more processing power. Such clusters require a method of organization and storage. A general method is physically housing individual computers in a single compartment. Examples of this method include housing regular tower and desktop computers on metal frames and rack-mounting computer units.

The method of stacking computers on metal frames is widely used. It consists of housing several computers on a metal shelf and electrically connecting all the computers together using cable wires to establish a network. The metal shelves are open to the environment and usually either bolted to the ground or stand as typical pillar type columns. One problem with this method is that it stacks whole computer modules in a vertical position. This type of stacking consumes large amounts of space and is very costly.

To an extent, the rack-mountable method of stacking reduces the large space consumption problem faced by the stacking method. This method includes a completely enclosed housing having a door and slidable drawer type racks for inserting and mounting computer modules. Simple racks allow this sliding to occur simply by allowing the metal faces from neighboring nodes to "scratch" against each other. This rack-mounted system has several drawbacks. It is expensive, it requires a compact Motherboard-CPU configuration (height cannot exceed 4.3 cm which is the generic height for the Rack-Mount), it is heavy (enclosed onto a metal box with its own CPU-cooling system, memory and Power-Supply), and it is difficult to service and upgrade since the internal parts of each computer module are enclosed into their own box and not easily accessible.

The blade rack method uses a blade-rack housing having slidable drawers for stacking circuit boards of computer modules without completely enclosing them in their metal box. So called "blade servers" use plastic, metal or another type of covering to enclose them into a proprietary package (i.e., housing). The units are then combined into a secondary housing that is attached to a rack-mountable structure. This method removes the typical top metal casing which covers the top, back, and sides of the computer circuit board but retains the bottom and front portion. Partially or completely hard-covered computer modules, with the top and back of each computer circuit board left open, are then inserted and mounted onto the slidable drawer. On some types of blade servers, such as the blades manufactured by "Rack-Savers," this allows air that flows through the entire blade rack housing to pass through each partially metal wrapped computer module. The blade-rack housing also includes cooling fans coupled to the housing for cooling these partially metal wrapped computer modules. This system still presents many downsides. The system is still expensive due to the partial metal wrapping and type of housing used and each module requires its own power supply. The computer modules are still heavy due to the weight of the partial metal wrapping and still consume a large space for storage. The cooling system only works if all the computer modules are inserted in place, if one of the computer modules is pulled out, the air-flow is interrupted and some of the computer modules over-heat.

Therefore, there is a need for a housing assembly that allows easy insertion and removal of a computer circuit board. The housing assembly should reduce overall weight, cost, and space required for housing computer modules. The housing assembly should also include a common power supply and central cooling system and provide a networked environment for efficient processing. In addition, the housing assembly should allow easy accessibility of components on computer circuit boards and allow each computer an option to act as part of the network or act as an individual module. Furthermore, the housing assembly should allow groups of computers to act as one main networked cluster or be divided into several smaller networked clusters that may be joined or separated from the main network cluster.

SUMMARY OF THE INVENTION

The invention is directed towards assemblies of electrical and electronic circuit boards. More specifically, the present invention relates to an assembly for housing multiple computer circuit boards. The assembly includes a housing that has several railings coupled to the housing. A connector is structurally and electrically coupled to the railings for hanging the computer circuit boards. Structural coupling between the connector and the railing is accomplished by placing the connector in contact with the railing in a file hanging method. This contact also creates an electrical coupling and establishes an electrical connection between the connector and the railing.

In an assembly aspect of the invention, the assembly is an assembly for housing a computer system. The assembly includes a housing that includes a plurality of railings. It further includes a plurality of computer modules that are attached to the railings, and the modules are integrated to form the computer system. Furthermore, it includes a power supply that provides power and ground to the railings.

Typically, the housing is open to the environment and includes one, two or three layers, and the computer modules include a circuit board.

Typically, the housing does not require a compact Motherboard-CPU configuration, and the assembly is constructed as separate segments that can be joined together to act as one unit.

Typically, the assembly is cylindrical in shape, and the housing comprises a plurality of columns that are coupled to the railings.

Typically, the computer modules are attached by hanging them from the railings, and there is a cooling system that includes a fan.

Typically, the power supply of the assembly includes a first stage, which converts a first voltage into a second voltage that is provided to a second stage that creates a third voltage suitable for the circuit board. The first stage is usually the only part of the power supply that provides power to the rails, and the second stage is activated by a signal coming from a motherboard. The power supply is usually divided into independent power sections that are equal in number to the number of separate sections of the assembly.

Typically, the power supply is located in a power section in the central portion of the housing. It is usually surrounded by a cylinder that is made of a heat isolating material.

Typically, the assembly includes a connection kit. The connection kit usually has a first side, a second side, and a plurality of connectors that are coupled to both the first side and the second side of the connection kit.

Typically, the connectors allow communication between computer modules within the housing. In certain cases, the connectors allow communication between the computer modules in the housing and an outside interface.

Typically, the assembly is constructed as four separate segments that can be joined together to act as one unit. Each separate segment is usually self-sufficient and includes a single fan as a cooling system.

Typically, the computer modules are hung using a frame that is structurally connected to the modules, and the modules do not include a case. The frame usually includes a metal wire frame, a plurality of hooks attached to the frame, and a translucent rod that acts as a status display for various processes that occur in the computer circuit board. The metal wire frame is typically made of a plurality of conducting metal strips joined together. In certain cases, the hooks are translucent and made of a non-conductive material such as acrylic or resin. Each hook is usually coupled to a connector that functions as a conductor.

Typically, the railings of the assembly include more than one layer. In certain cases, the railings include a first layer, a second layer, a third layer and a fourth layer. In such cases, the first layer is typically a conducting material; the second layer is typically a non-conducting material that overlays the first layer and that includes a first side and a second side; the third layer is typically a conducting material placed on the first side of the second layer; and, the fourth layer is typically a non-conducting material. The first side of the second layer is usually opposite to the second side of the second layer. The second side of the second layer usually includes openings to the first layer at equidistant intervals, and the fourth layer includes two types of openings—a first opening type and a second opening type. The first opening type typically lies directly over top of the second layer openings allowing access to the first layer; the second opening type typically occurs on the side opposite of the first opening type and allows access to the third layer. The conductive material of the third layer is usually a metal strip. Exemplary materials from which the conductive material of the third layer are made include silver-plated copper and aluminum.

The invention is also directed towards a method of distributing software to individual computer modules. In such a method aspect of the invention, the method includes the following steps: categorizing computer modules into separate groups, wherein the groups are server nodes and client nodes, and wherein the client nodes are further categorized as either non-terminal client nodes or terminal client nodes; configuring a network such that when a new client node enters the network, a request for becoming part of the network is sent from the client node to a server node; performing a scan on the client node to determine the client node's hardware information; determining client node status by applying rules to the hardware information obtained in the scan; and, distributing software to the client node according to its status.

Typically with respect to the method, the computer modules are fully or partially contained in a modular housing assembly.

Typically, touchable client nodes comprise a hard drive, RAM memory, a processor, and either a graphical card or a monitoring machine.

Typically, the client node's hardware information is stored on a controller node. The client node typically reboots after its hardware information is stored on a controller node.

Typically, determined client node status is either that of a terminal or non-terminal node. Furthermore, if client node status is determined to be that of a terminal node, then the node is usually prepared for design, 3D animation or secretarial functions. If the client node status is determined to be that of a non-terminal node, then the node is typically prepared to become a 3D-rendering engine.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

The disclosure of U.S. Patent Application entitled "A HOUSING ASSEMBLY FOR STACKING MULTIPLE COMPUTER MODULES," having Ser. No. 10/629,320, filed on Jul. 28, 2003, is expressly incorporated herein by reference.

The invention is directed towards assemblies of electrical or electronic circuit boards. More specifically, the present invention relates to modular assemblies for housing multiple computer circuit boards. The assembly includes a housing that has several railing coupled to the housing. A connector is structurally and electrically coupled to the railings for hanging the computer circuit boards. Structural coupling between the connector and the railing is accomplished by placing the connector in contact with the railing in a file hanging method. This contact also creates an electrical coupling and establishes an electrical connection between the connector and the railing.

Figure 1A:
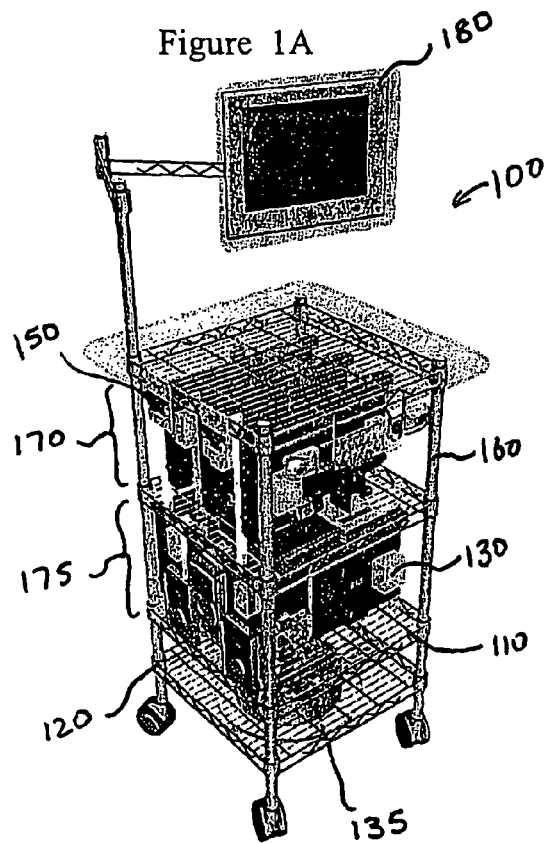
FIG. 1A illustrates a cubical shaped housing assembly for housing multiple computer modules according to one embodiment.
Figure 1C:
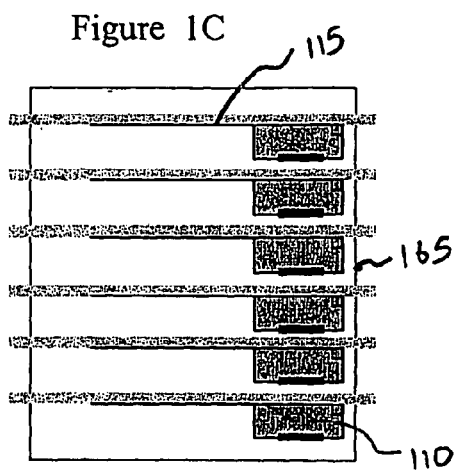
FIG. 1C illustrates computer circuit boards housed close next to each other in a cube shaped housing using a file hanging method according to one embodiment.
Figure 1B:
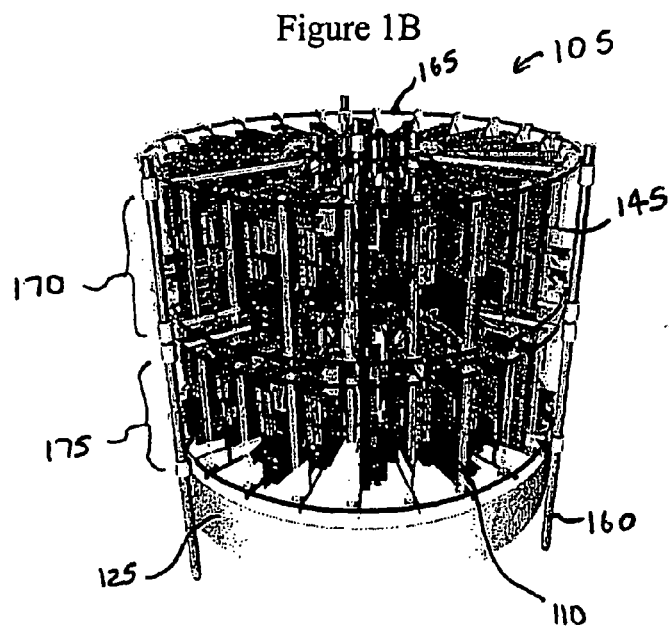
FIG. 1B illustrates a cylindrical shaped housing assembly for housing multiple computer modules according to one embodiment.

FIG. 1A and 1B illustrates modular—or adaptable—housing assemblies 100 and 105 for housing multiple computer modules according to one embodiment. The housing assemblies 100 and 105 include several computer modules 110 coupled to a frame assembly 115, housings 120 and 125, a cooling system having cooling components 150 and 155, a power supply 140, a junction box 145, a connection kit 150, and accessories such as a monitor 185.

Housings 120 and 125 are open to the environment and include several columns 160 and railings 165. The columns 160 and railings 165 are coupled together and form the structure of housings 120 and 125 (As will be discussed in further detail in FIG. 4 below). This structure allows hanging of several computer modules 110 in a file hanging method. FIGS. 1A and 1B depict housing assemblies having two layers, an upper layer 170 and a lower layer 175, for housing computer modules on top of each other. Alternatively, a housing assembly having one layer or more than two layers may also be used.

Figure 1D:
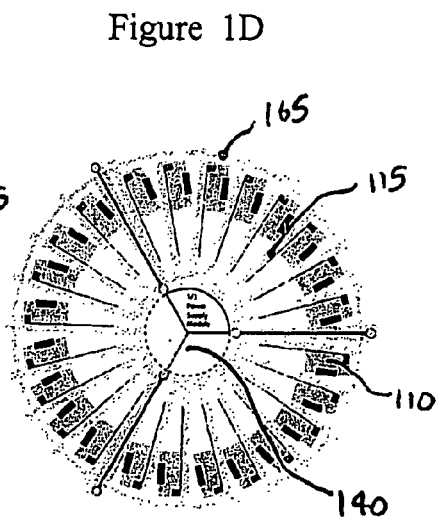
FIG. 1D illustrates computer circuit boards housed close next to each other in a cylindrical shaped housing using a file hanging method according to one embodiment.
Figure 1E:
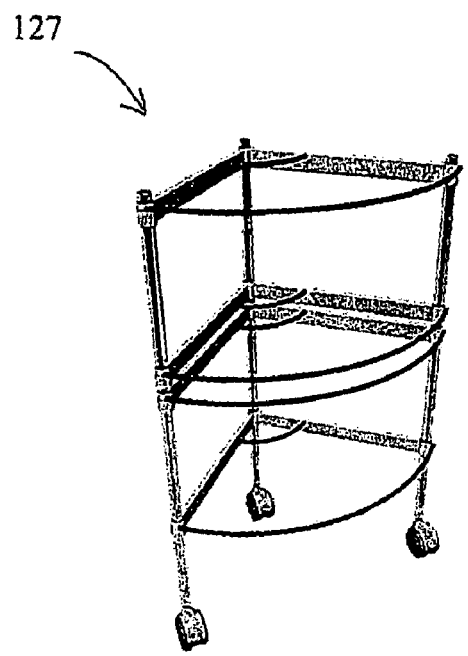
FIG. 1E illustrates a quarter segment of a cylindrical shaped housing according to one embodiment.
Figure 1F:
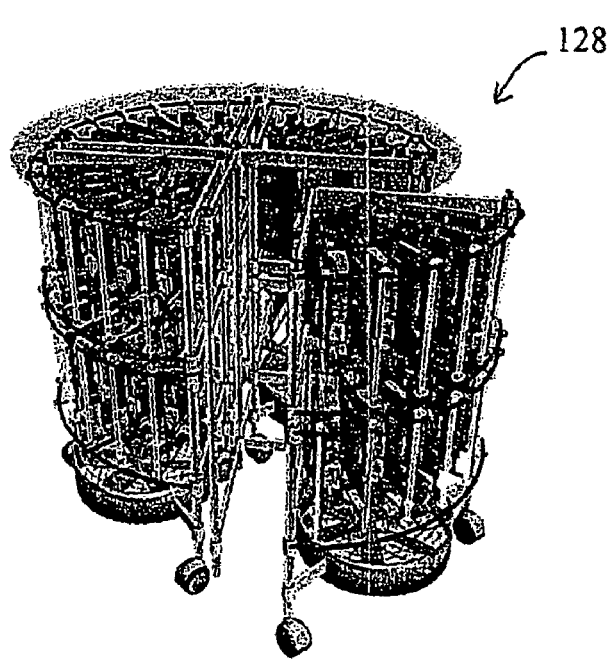
FIG. 1F illustrates a segmented cylindrical housing assembly having four separate segments for housing multiple computer modules according to one embodiment.

Housing 120 and 125 can either be constructed as a single unit or constructed as separate segments that can be joined together to act as one unit. For example FIG. 1E shows a quarter segment of a cylindrical shaped housing structure (herein after referred to as segmented cylindrical housing 127). The segmented cylindrical housings can be arranged together in groups, expanding the housing capacity in a geometrically harmonious manner. For instance, four of these quarter cylindrical housing segments can be joined to form a cylindrical-segment housing assembly 128 (as shown in FIG. 1F). FIG. 1F depicts a four-segment cylindrical housing construction, however other variations in number of segments or shapes such as cubical shaped segmented assemblies are also contemplated. Each segmented cylindrical housing is self sufficient. Accordingly, segments may act as an individual assembly or can be joined together in any combination to act as one unit. For example two quarter cylindrical housing assembly segments can be joined together, resembling a half circle, and act as one assembly unit.

The computer modules 110 include a computer circuit board having several electrical components and connectors coupled to the computer circuit board. The circuit boards are typically AT or ATX circuit boards, however other types of circuit boards used in computer applications are also contemplated. The computer circuit boards are typically hung uncovered, without any metal case, on the railing 165 of housings 120 and 125 and open to the environment. Alternatively, a tight-fit, light casing with means to allow the circuit to benefit from outside airflow may also be used for the circuit boards. This method of hanging allows placement of computer circuit boards in close proximity to each other. FIGS. 1C and 1D show computer circuit boards housed using this file hanging method in a cube shaped housing 120 and a cylindrical shaped housing 125 respectively. A cubical 120 and cylindrical 125 housing is shown, however other shaped open air housings are also contemplated.

A file hanging method without the metal wrapping decreases weight and cost of each computer module that is typically attributed to the metal case. Furthermore, arrangement of computer circuit boards next to each other allows easy connection or sharing of components between computer modules. This is accomplished through having no barriers and a minimal gap between the uncovered computer circuit boards. Some examples of component sharing between these computer circuit boards are universal serial bus (USB) switches, that can make USB components available to multiple modules, hard drive if they are swappable, and VGA connections combined into one switch for easy monitoring from one display.

Figure 2:
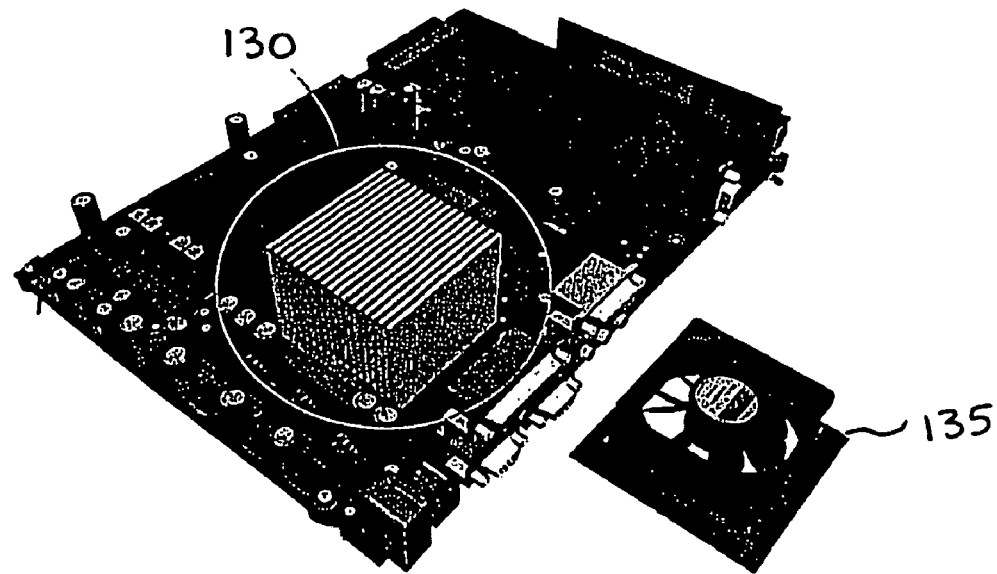
FIG. 2 illustrates cooling components of a cooling system used for cooling electrical components on a computer circuit board according to one embodiment.

Electrical components on these uncovered closely stacked computer circuit boards are cooled using a cooling system. The cooling system uses cooling components such as heat sinks 130 or a fan 135 (As shown in FIG. 2) either separately or in combination to cool these components. The fan 135 is centrally located and coupled to the housings 120 and 125 for cooling the components. Air from the fan 135 channels through the open spaces between the computer circuit boards that are open to air and cools the CPU's and other components coupled to the computer circuit boards. In case of the segmented housing assemblies, each segment typically includes its own fan coupled to the segmented portion of the housing.

As discussed earlier, heat sinks 130 are typically coupled to the computer circuit boards and may also be used in combination or separate from the fan 135 to cool the components. When used separately, heat sinks 130 use natural airflow that passes between the uncovered computer circuit boards for cooling. When used in combination with a fan 135, the air from the fan 135 channels between the open circuit boards and cools the components and the heat sinks 130. Since the computer circuit boards are open to air, other cooling methods may be used for heat dissipation, including but not limited to the follow methods: coupling a heat sink between the circuit boards and a metallic railing or column for conduction; and, providing channeling devices to direct airflow within the structure.

The power supply 140 includes a large transformer and is coupled to housings 120 and 125. It includes two different stages and is divided into several power independent sections for supplying power to several computer circuit boards. The first stage converts VDC or VAC into a lower AC or DC voltage. This stage represents the bulk of the electrical transformation and has the most heat emission. It is typically the only part of the power supply that feeds the rails. The second stage picks up the VDC, for example, and ground from several contact places on the rails and uses these voltages to create different DC voltages required by ATX, AT and other standards. This stage is activated by a signal coming from the motherboard itself.

Figure 3:
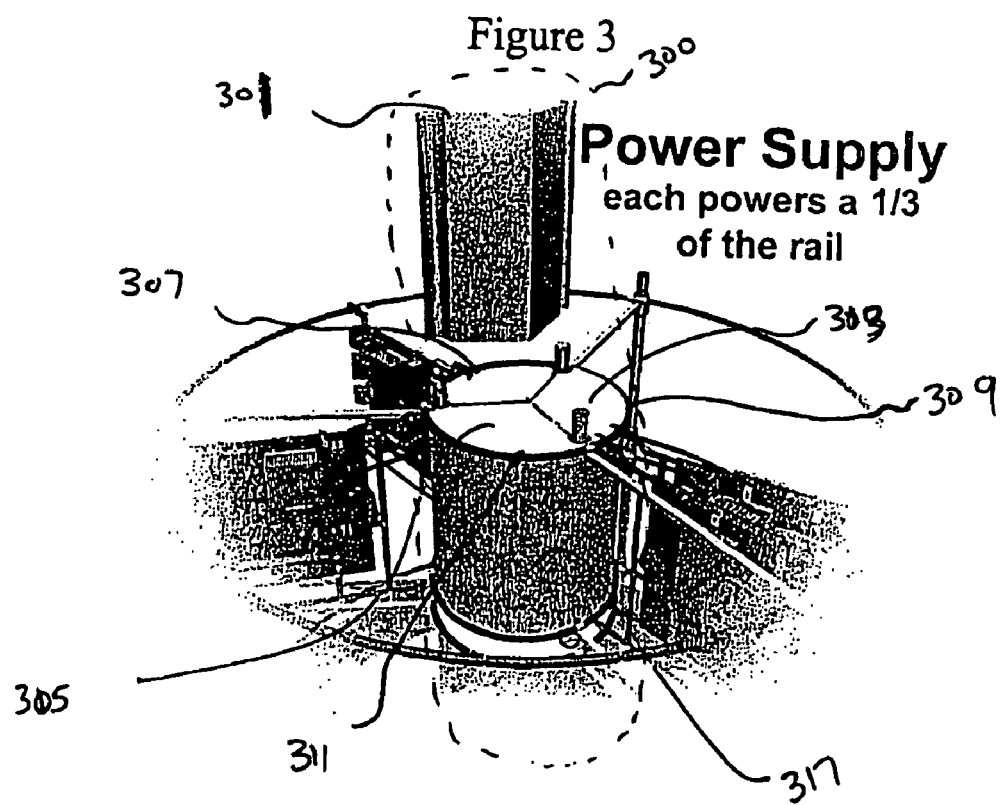
FIG. 3 illustrates an exemplary power supply for the powering the upper layer of the cylindrical housing assembly according to one embodiment.

The transformer in the power supply is large enough to accommodate power for all the computer modules in the housing assemblies 100 and 105. Since transformers generate heat, the power supply is located at a safe distance from the sensitive electrical components of computer circuit boards. This prevents heat dissipation from the transformer from affecting the performance of the sensitive components. In one embodiment, FIG. 3 shows an exemplary power supply 300 for the upper layer 170 of the cylindrical housing assembly 110. In this embodiment, the power supply is divided into three independent power sections (i.e., 301, 303 and 305). Alternatively, other variations in number of power supply sections, such four independent power sections, for a four segment housing assembly are also contemplated.

Power is supplied to each of these three sections and then from each power section to its coupled railing 307, 309 and 311 respectively. All three power sections—301, 303 and 305—are located away from the computer circuit boards 315 and in the center of the housing. The power sections are typically surrounded by a cylinder 317. The cylinder 317 is made of a heat isolating material, such as acrylic, for isolating heat dissipated from the power sections 301, 303 and 305. This prevents heat generated by the power sections from affecting sensitive components on the computer circuit boards 315 or any other components in the housing assembly.

Alternatively, in the case of a segmented housing assembly, each segment includes its own power supply that is placed at a back section of the segmented housing. It may be coupled to the housing segment by coupling means such as—inserted on a sliding rack, snapped onto the housing columns, or being attached through screws or rivets. A heat isolating material, such as acrylic, is used for preventing heat dissipation generated by the power supply from affecting computer modules inside the segmented housing assembly. Power from these power supplies is supplied similarly by transporting the power to railings, and subsequently to the computer modules. The railings are electrically coupled either directly or through cables to the power supply.

The connection kit 150 includes several connectors and is coupled to the housing assemblies 100 and 105. Connectors are coupled to both sides of the connection kits for allowing communication between computer modules located inside the housing assemblies 100 and 105 and between computer modules located inside the housing assemblies 100 and 105 and any outside interface. Several shielded cables are coupled to these connectors from both sides for carrying out these communications. Since all the computer modules in the housing assemblies 100 and 105 are designated as either client or server modules, the connection units allow each client module to operate as an individual unit. Server modules and client modules typically differ, for example, in that server modules include more memory, hard drive and components compared to the client modules. In addition, in some cases such as in a cubical shaped housing assembly 100, server modules may be placed in the frontal area of the housing assembly.

Housing assemblies 100, 105 and 127 may also include various accessories that are additional features to the housing assemblies 100, 105 and 127. For example, accessories such as a monitor 180, switching box, and mixing box may also be included. Switching and mixing boxes may be used for sound and graphics illustration. For example, a switching box can be used to connect several computer circuit boards in the housing assemblies 100, 105 and 127 to a single monitor 180 for display.

Figure 4:
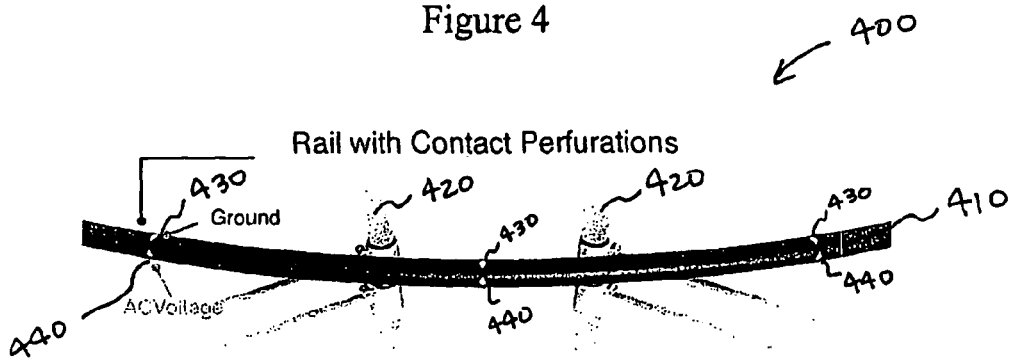
FIG. 4 illustrates a section of housing having railings and columns coupled together to form the structure of the housing according to one embodiment.

FIG. 4 illustrates a section 400 of housing 125 having tubular railings 410 and columns 420 coupled together to form the structure of the housing according to one embodiment. As shown, the railings 410 and columns 420 are round in shape, however square or other shapes are also contemplated. Railings 410 and columns 420 are coupled together at various locations using a variety of methods such as screw fastener assembly, rivets, welding, and modular connectors. The modular connectors include a mechanism on the railing that attaches to a cylindrical "cup" on the columns. The coupling holds the railings 410 and columns 420 together and provides sturdiness to the housing structure.

A housing structure is typically divided into a number of identically shaped segments. For instance, in the case of cylindrical shaped housing 125, the railing 410 is divided into three equiangular segments. Each ⅓ section 'snaps-on' to the main housing structure by means of a connector lying on the transversal bars and coupled to the columns 420 as discussed above. In the case of cube-shaped housing 120, the railings 410 are divided into 4 segments and also coupled to the housing structure and columns similar to the cylindrical housing. The number of railing segments and size of the each segment depends upon the size and shape of the housing. Each segment of the segmented housing assemblies typically has one railing that is attached to the columns in the segment. The size and shape of each railing in the segment varies depending upon the size and shape of the segment housing assembly.

Figure 5:
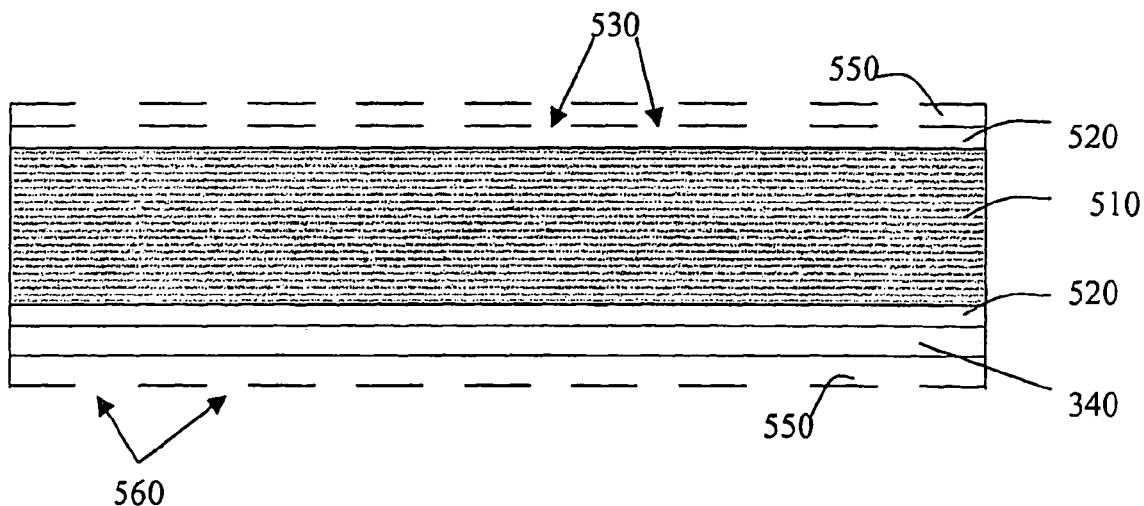
FIG. 5 illustrates a cross section of a multilayer railing that is used in the housing assemblies according to one embodiment.

As discussed earlier, in addition to providing structural sturdiness, the railings 410 typically are made of multiple layers allowing them to act as conductors for transporting power and ground to the computer circuit board, either directly or through the second stage power supply. The transport is made possible by having the railing electrically coupled to a power supply as well as to hanging computer circuit boards through contact perforations made in the multiple-layered railing at various locations. FIG. 5 illustrates a cross section of one such exemplary three-layer railing.

The first section is the main metallic structure of railing 410, in other words the metal bar itself (510). Bar 510 is covered by a first 'isolating rubber pipe' 520, which is 'shrunk' to attach snuggly to the bar 510. This type of isolating rubber pipe 520 consists of a tube made out of a special rubber. When heat is applied to this material, it shrinks to conform to the shape of the object it is evolving (e.g., metal bar 510). Eight elliptical shaped cuts 530 are then made on the top area of this rubber surface at equidistant intervals. These cuts 530, also shown as contact perforations 430 in FIG. 4, provide grounding access to computer circuit boards when the circuit boards are electrically coupled to them.

The second layer of the three layer multilayer railing 410 includes a conductive low-resistance metal strip 540. The metal strip 540 is placed in front of the bar 510, opposite to the top side of the railing 410 having cuts 530. It has connectors on the ends that allows for a current to be applied. The metal strip 540 may be constructed from any suitable conducting material, such as aluminum or silver-plated copper.

A second 'isolating rubber pipe' 550 is layered and shrunk over the first isolating rubber pipe 520 to form the third layer. This time, as well as containing openings (i.e., cuts) on top of the bar, the 'isolating rubber pipe' 550 is also cut with elliptical protrusions on the front area of the bar. The elliptical protrusions on top of the bar are aligned with elliptical cuts 530 on the first isolating rubber pipe 520. This alignment allows conduction to occur all the way down to the main metallic bar 510 on those eight places of the railing 410.

On the front area of the railing 410, conductive strip 540 can be accessed at the eight elliptical cuts 560 in the second layer, i.e., the second isolating rubber pipe 550. These cuts 560 are also shown as contact perforations 440 in FIG. 4. This layering combination makes the railing 410 a rail-rubber-conductor-rubber sandwich, with eight accesses to the bar 510 on top and eight to the conductive strip 540 in front. The metallic rail 510 is supplied with grounding, and the conductive strip is charged with an appropriate AC or DC voltage supplied by the first stage power supply.

A rail-rubber-conductor-rubber sandwich construction is shown. This construction allows single or multiple voltages and ground access to the computer circuit boards at the various perforations as discussed earlier. For example, the metal bar may be supplied with a separate power instead of ground and made accessible to the computer circuit boards. Alternatively, a multiple layer railing 410 having multiple metal strips and isolating layers can be constructed. Additional metal strips and isolating layers containing openings at various locations allow multiple sources of power to be supplied to the computer circuit boards.

The voltages and ground from the railing is accessed by the computer circuit board by means of a coupling between the railing and the metal frame assembly, including hooks attached to the metal frame (e.g., at top and bottom of frame). Voltages are picked-up by the metal frame hooks and are then transferred to the second stage power supply through wires. The voltages are transformed into suitable voltages and sent to the motherboard through standard ATX power cables. Ground is distributed throughout the metal frame to the motherboard. Connections to ground are established through the hooks making contact to the rail ground. Ground is also provided to the motherboard by the second stage power supply through a cable connection to the motherboard standard power-input.

Figure 9:
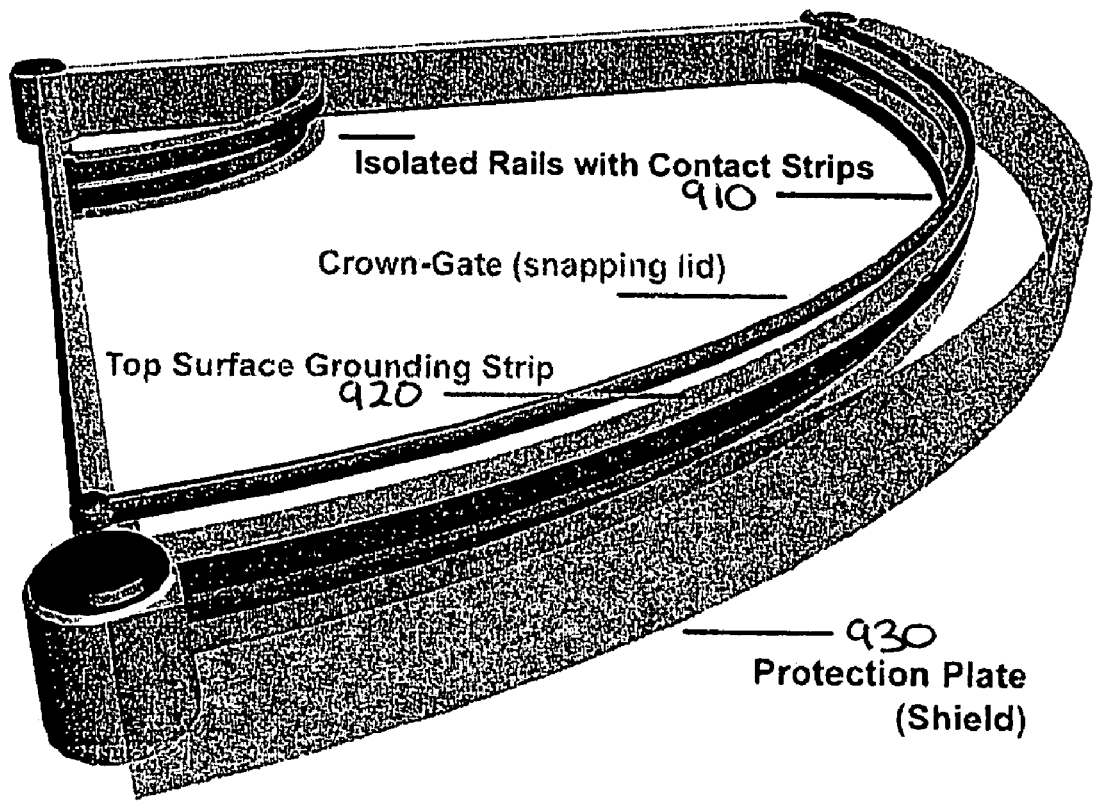
FIG. 9 illustrates a cylindrical type rail that is used in certain embodiments of the invention.

Alternatively to the tubular railings 410, the rails may be cylindrical in nature, as shown in FIG. 9. As shown, the cylindrical rail system is composed of an independent ¼-section. The rails themselves are made non-conductive; however, areas for contact are created on the rails by running strips of conductive materials 910 on the circumference of the cylinder-segment. Furthermore, more than one contact area can be created on the same rail, by running the strip at different heights, and on different surfaces of the cylinder. For example, the front rail, the top-surface is used for conducting ground 920, while the front-surface of the same rail is used to conduct 0VAC, and the back-face to conduct −15VDC. The back rail then uses its top surface for conducting ground, and its back surface for conducting +15VAC. Also a protection plate 930 or "shield" is added to the front of the outmost rail to protect against electrical shock.

Figure 6:
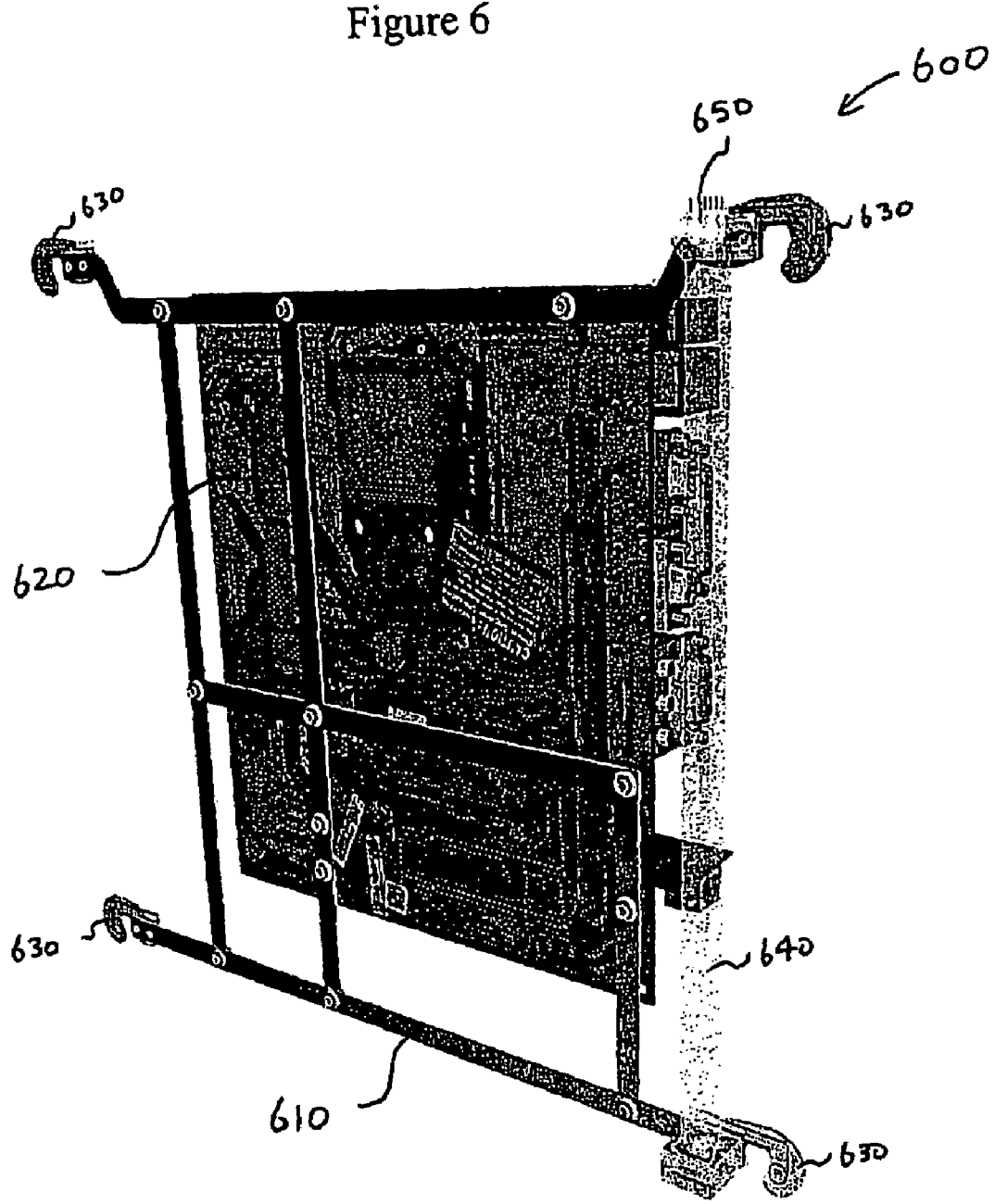
FIG. 6 illustrates a frame assembly for hanging computer circuit boards on a railing according to one embodiment.

FIG. 6 illustrates a frame assembly 600 for hanging computer circuit boards on a railing according to one embodiment. As shown, the frame assembly 600 includes a metal frame 610 coupled to a computer circuit board 620, and several hooks 630 and a translucent rod 640 coupled to the frame 610. Alternatively, the frame may be constructed from a non-conducting material, such as acrylic.

The frame 610 is typically made of several conducting metal strips joined together through coupling means such as screw fastener assembly or rivets. The strips may be joined in several positions to construct a frame 610 that can support the weight of the computer circuit board 620. Several perforations or holes in the metal strips of the frame 610 allow it to be coupled with the computer circuit board 620. Coupling consists of aligning holes on the frame 610 with holes on the computer circuit board. Holes exist at various locations in the wire frame to allow variations in circuit boards. For example either AT and ATX circuit boards or any other future circuit board with a hole configuration different than the AT or ATX circuit boards may also be aligned for coupling to the frame 610. Once aligned, a screw or rivet is passed through the aligned holes and fastened. This coupling holds the computer circuit board and frame assembly 600 in position.

The hooks 630 are typically translucent and made of non-conductive material, such as acrylic or resin, and are attached to the frame 610 through a screw fastener assembly. Alternatively, hooks can also be made of similar non-conductive materials. The holes on the frame 610 are aligned with the holes on the hooks 630 and then secured using the screw fastener assembly. The hooks 630 are used for hanging the frame assembly 600 onto the railings. Hanging allows the hooks to be placed on the railings resembling a file hanging method or a coat hanger placed on a coat rack.

A small connector coupled to hooks 630 allows the hooks 630 to function as a conductor for furnishing the power and ground to the components of the computer circuit board 620. (Power from the rails is captured by the hooks and directed to the second stage power supply, is regulated, and then directed through a suitable cable to the circuit board.) The small connector establishes an electrical connection between the railing and the computer circuit board when the hooks 630 are placed on any of the elliptical cuts 430 and 440 of the railing. This electrical connection allows power and ground from the power supply to be supplied to the computer circuit board 620. The electrical connection can be terminated by lifting the hook 630 from the railing similar to lifting a coat hanger from the coat rack. Furthermore, each metal frame assembly includes at least one hook. Each hook in a metal frame assembly, such as the metal frame assembly displayed in FIG. 6 having four hooks, is coupled to a railing and is capable of receiving different voltages on each of its hooks.

Translucent rod 630 is coupled between two hooks 640 in a cubical-shaped housing assembly using any appropriate means (e.g., screw fastener assemblies). Alternatively, the translucent rod 630 may also be coupled in other locations of the metal frame assembly and also used in a cylindrical shaped housing assembly. The rod 640 is typically made of acrylic material and is translucent. Its translucent properties allow the rod 640 to act as a status display for various processes that occur in the computer circuit board. Several light emitting diodes (LED's) 650 are coupled to the hooks 630 and the rod 640, which allows them to glow when the LED's 650 are lit. LED's 650 can be of any color. For example, when there is network activity taking place, the hook 630 or rod 640 might blink with a bluish glow; however, the glow might be white in color if it's the hard-drive of the computer module that is being accessed. Furthermore, if the computer circuit board senses that the CPU is overheating, a red-glow will be emitted by the LED's 650.

The frame assembly 600 is placed spatially on the railings. The spatial placement provides adequate space between computer circuit boards for airflow to dissipate the heat generated from the computer circuit boards 620; yet, it is close enough to the other frame assemblies 600 to allow sharing of components that are common between the circuit boards. In the cylindrically shaped housing assembly 105, frame assemblies 600 are arranged around two concentric arches to maximize airflow distribution throughout the system. In addition, the frame assemblies 600 are placed at a safe distance from the power supply. This ensures heating of any sensitive components on the computer circuit board caused by heat dissipation from the power supply.

Figure 7:
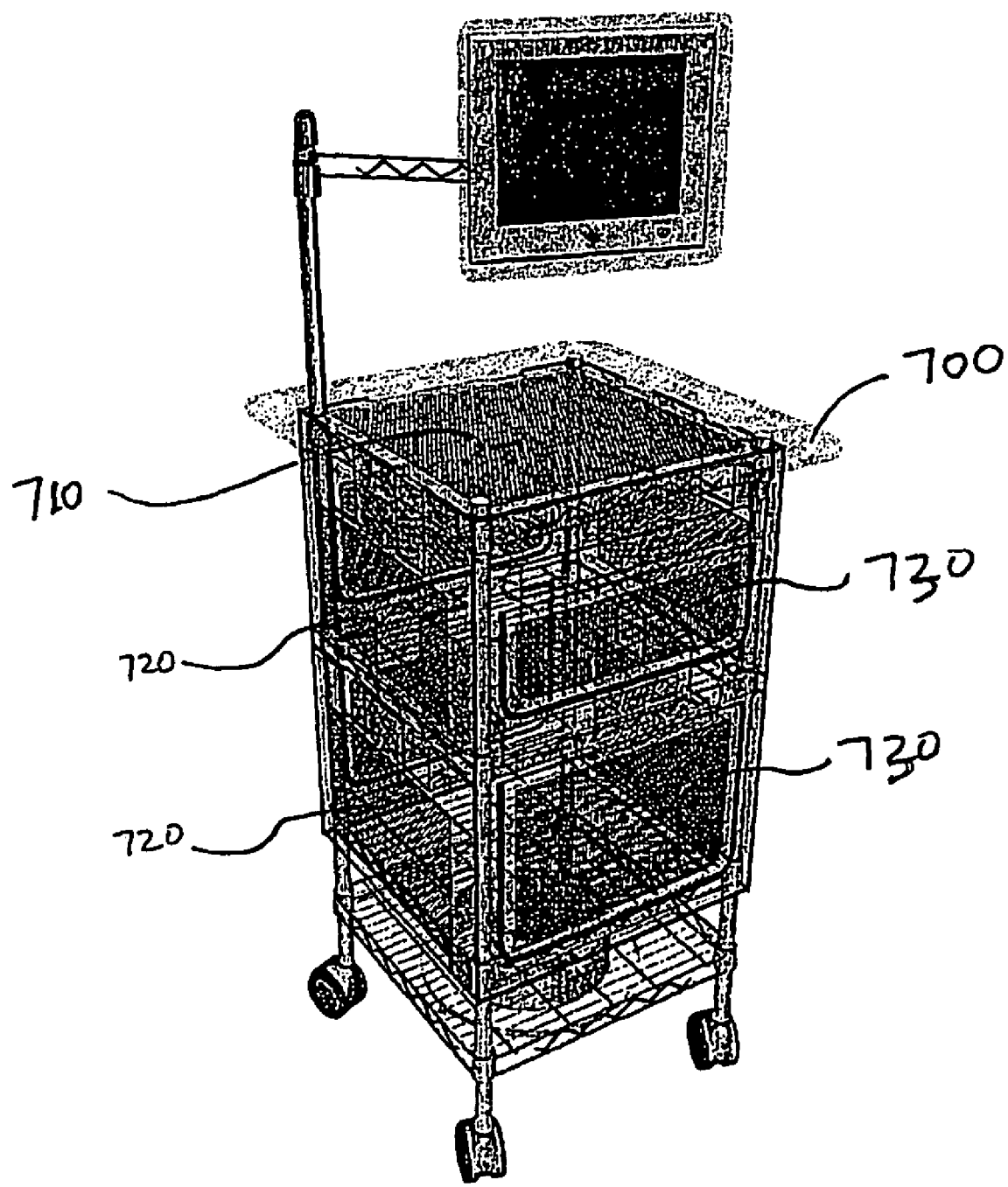
FIG. 7 illustrates a casing used for protecting devices inside the open air housing assemblies from dust in certain environments according to one embodiment.

FIG. 7 illustrates a casing 700 for housing assemblies 100, 105, and 127. In its regular operation, housing assemblies 100, 105, and 127 are uncovered and do not include a casing. However a casing 700 can be used in environments that are either dusty or require protection of components on the circuit board due to debris etc. Casing 700 covers the circuit boards and its components by molding around the housing assemblies 100, 105, and 127. FIG. 7 depicts a casing for cubical housing assembly 100, however such a casing may also be used in cylindrical housing assembly 105 and segmented housing assembly configurations.

As shown, the casing 700 is made of plastic and includes breathing holes for allowing air through the housing assemblies 100, 105, and 127. Other lightweight materials may also be used as an alternative to plastic. Casing 700 includes a top side 710, a vertical side 720, and optionally a bottom side or any combination of top, vertical and bottom sides. The breathing holes may be located on all sides of the casing or only on vertical side 720. A replaceable filtering material is coupled to the casing to prevent any particles, such as dust or impurities, from entering the housing assemblies. Casing 700 also includes zipper doors 730. These are fitted throughout the casing to allow easy access to the computer modules without the necessity of removing the entire panel.

Figure 8:
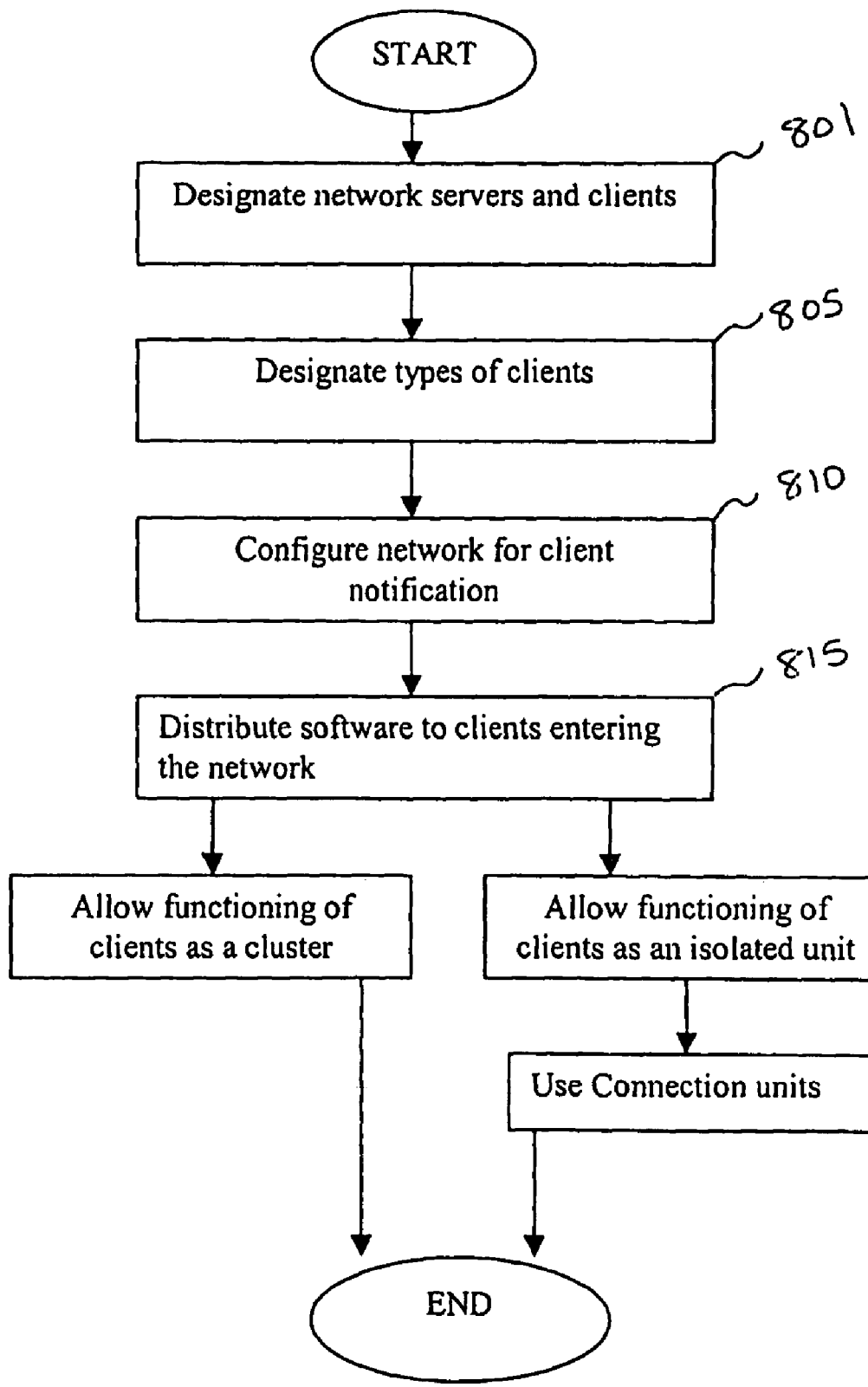
FIG. 8 is a block diagram that illustrates one operation for distributing software and allowing individual computer modules to act as independent units according to one embodiment.

FIG. 8 is a block diagram that illustrates one operation for distributing software and allowing individual computer modules to act as independent units according to one embodiment. (At 801) All the computer modules stacked in the housing assemblies 100, and 105 are designated into two categories for creating a network. These categories are server computer modules (Server Nodes) and client computer modules (Client nodes).

The server nodes, usually one or more in the housing assemblies 100 and 105, include server software such as win2k Server, and Linux Server. They are typically placed in the frontal part of the housing assembly 100 and 105 and usually have more memory, hard-drives and components than client nodes. One of their functions as part of the network is to distribute software to client computers and monitor their functions when needed. (At 805) The client nodes, which are typically present as a plurality in housing assembly 100 and 105, are categorized into two separate groups. These are non-terminal client nodes and terminal client nodes. The non-terminal client nodes are usually used for raw-processing power and are fully contained in the housing assemblies. They contain their own RAM memory, processor, and either operate without a hard-drive (diskless), share a drive via "switching",or include their own hard drive. Alternatively, a small-sized notebook hard drive can be coupled to the non-terminal node's computer circuit board. In yet another alternative embodiment, the small-sized notebook hard drive is electrically but not physically coupled to the computer circuit board and coupled to the housing assembly 100 and 105. If a user desires, built in graphics capabilities on the computer circuit board or plug-in graphics cards can be used to monitor these non-terminal computer nodes.

The terminal clients can include their own hard drive or can be diskless, and can contain RAM memory, processor and either a graphical card or another method for monitoring machine. They are communicatively coupled to a local or a remote user. Terminal clients require connections that extend the domain of the housing/casing assembly. For instance, extensions (wires, cables, wireless-connections, etc.) are attached to connections of the touchable client and extend its signals to components such as a monitor, mouse, keyboard, digitizing pad, speaker, etc.

At 810, after categorizing computer modules into separate groups, software that resides at the controller nodes configures the network and establishes network connections. These network connections prepare the network for adding or removing client nodes. The network connections also allow the controller units to distribute "operating systems", "programs",and "settings" to the client nodes, ultimately preparing them for predetermined functions.

The network is configured such that when a new client node enters the network, accomplished by hanging a new computer module on the railing, a request for becoming a part of the network is sent from the entering client to the server nodes. A temporary image is loaded onto the node, and a thorough scan is performed on it which determines all the hardware information of the node. This information is stored on the server, and the new node reboots. From this stored node-data, the server can now use rules and guidelines programmed by an administrator (i.e., a user with rights to the server) to decide node behavior.

In a first category decision, the server decides if the node will be a terminal or non-terminal client. The server, if desired, can make other sublevel determinations. For instance, a terminal node can be a node prepared for design, 3D animation, or secretarial functions, all of which is dependent on the graphical card present on the node. The system, after a determination, would install correct applications and operating systems for the appropriate functions for the terminal node (815). In the case of a non-terminal node, for example, a server may determine that, if it contains sufficient memory, then it will become a 3D-rendering engine. If the same node had less memory, but had a large hard drive, then the system could decide that the node is to become part of a "web-farm" and serve HTML through the internet.

If the client node is a terminal client node, then a connection kit is typically required for distributing software or making the terminal client node part of the network. Connection kits include connectors for USB, Firewire (iee-1394), Monitor, Corn Port, Parallel Port, Joystick port, and can include other connectors to allow communication between terminal client nodes and other nodes in the network or between terminal client node and a user of the network. For example, the user may be remote from the terminal client node, but will have at his disposal all the functions designed for his use. This is possible since the predetermined functions have been transferred to the terminal client and now it can act on its own without the need to be connected to the network for operation.

Server-client and non-terminal/terminal client relationships and principles as mentioned above are also applied in the case of a segmented housing assembly. In addition to those relationships and principles, each segment of the segmented housing assemblies includes its own server-client nodes and non-terminal/terminal clients and acts as an independent cluster. Each segment may be joined with any number of segments to form a bigger cluster. This can be accomplished by electrically coupling the two segments using network cables and some software configuration to form one single cluster. For example, if two quarter segments of a cylindrical shaped segmented housing assembly are joined, resembling a half circle, then a network connecting all the modules in the two segments is established and functions similar to housing assemblies 100 and 105 as mentioned above as an independent group of nodes.

The modular assemblies of the present invention fit into a larger scheme of modularity having three basic levels. At a first level are the assemblies of the present invention. The assemblies can be arranged in a number of ways to form variations on a final structure that conform to the requirements of an individual or business. The second level concerns the number of CPUs per assembly. The modular assemblies can house a single CPU or be filled to maximum capacity. Assemblies, at the third level, can be expanded in a modular fashion. In other words, one can expand groups of CPU-nodes and adapt them to fit virtually any working environment. Full working structures are combined in a harmonious fashion to increase the processing power of a system.

In the previous description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

We claim:

1. A housing assembly for housing at least one computer module, the housing assembly comprising:
    at least one railing, the at least one computer module being attached to at least one hook that non-fixedly connects the at least one computer module with the at least one railing; and
    a power supply coupled to the at least one railing for supplying power to the at least one computer module.

2. The housing assembly of claim 1, wherein:
    the at least one railing comprises first and second railings;
    the at least one hook comprises first and second hooks; and
    the at least one computer module comprises first and second corners, wherein the first corner is attached to the first hook that non-fixedly connects the computer module with the first railing and the second corner is attached to the second hook that non-fixedly connects the computer module with the second railing.

3. The housing assembly of claim 2, wherein the at least one computer module is connected with the first and second railings only at the first and second corners.

4. The housing assembly of claim 2, wherein
    the first and second corners of the at least one computer module comprise a pair of adjacent corners; and
    the at least one computer module is not connected with the first and second railings at a middle region between the first and second corners.

5. The housing assembly of claim 2, wherein:
    the at least one computer module further comprises third and fourth corners; and
    the at least one computer module is not connected with the first and second railings at the third and fourth corners.

6. The housing assembly of claim 2, wherein:
    the at least one railing further comprises third and fourth railings;
    the at least one hook further comprises third and fourth hooks; and
    the at least one computer module further comprises third and fourth corners, wherein the third corner is attached to the third hook that non-fixedly connects the computer module with the third railing and the fourth corner is attached to the fourth hook that non-fixedly connects the computer module with the fourth railing.

7. The housing assembly of claim 6, wherein the at least one computer module is connected with the third and fourth railings only at the third and fourth corners.

8. The housing assembly of claim 6, wherein
    the third and fourth corners of the at least one computer module comprise a pair of adjacent corners; and
    the at least one computer module is not connected with the third and fourth railings at a middle region between the third and fourth corners.

9. The housing assembly of claim 1, wherein the housing assembly is open to the environment.

10. The housing assembly of claim 1, wherein the housing assembly includes one, two or three layers.

11. The housing assembly of claim 1, wherein the housing assembly is constructed as separate segments that can be joined together to act as one unit.

12. The housing assembly of claim 11, wherein each separate segment is self-sufficient.

13. The housing assembly of claim 11, wherein each separate segment comprises a cooling system comprising a fan.

14. The housing assembly of claim 1, wherein the housing assembly is cylindrical in shape.

15. The housing assembly of claim 1, wherein the housing assembly is not cylindrical in shape.

16. The housing assembly of claim 15, wherein the at least one railing comprises first and second railings configured parallel to each other.

17. The housing assembly of claim 1, wherein the housing further comprises a plurality of columns, wherein the columns are coupled to the railings.

18. The housing assembly of claim 1, wherein each computer module comprises a circuit board.

19. A housing assembly for housing at least one computer module, the housing assembly comprising:
    at least one railing, the at least one computer module being attached to at least one hook that connects the at least one computer module with the at least one railing and allows the at least one computer module to slide along the at least one railing; and
    a power supply coupled to the at least one railing for supplying power to the at least one computer module.

* * * * *